H. H. VARLAND.
COMBINED MANURE LOADER AND SPREADER.
APPLICATION FILED JUNE 5, 1918. RENEWED NOV. 26, 1919.
1,346,433.
Patented July 13, 1920.
5 SHEETS—SHEET 1.
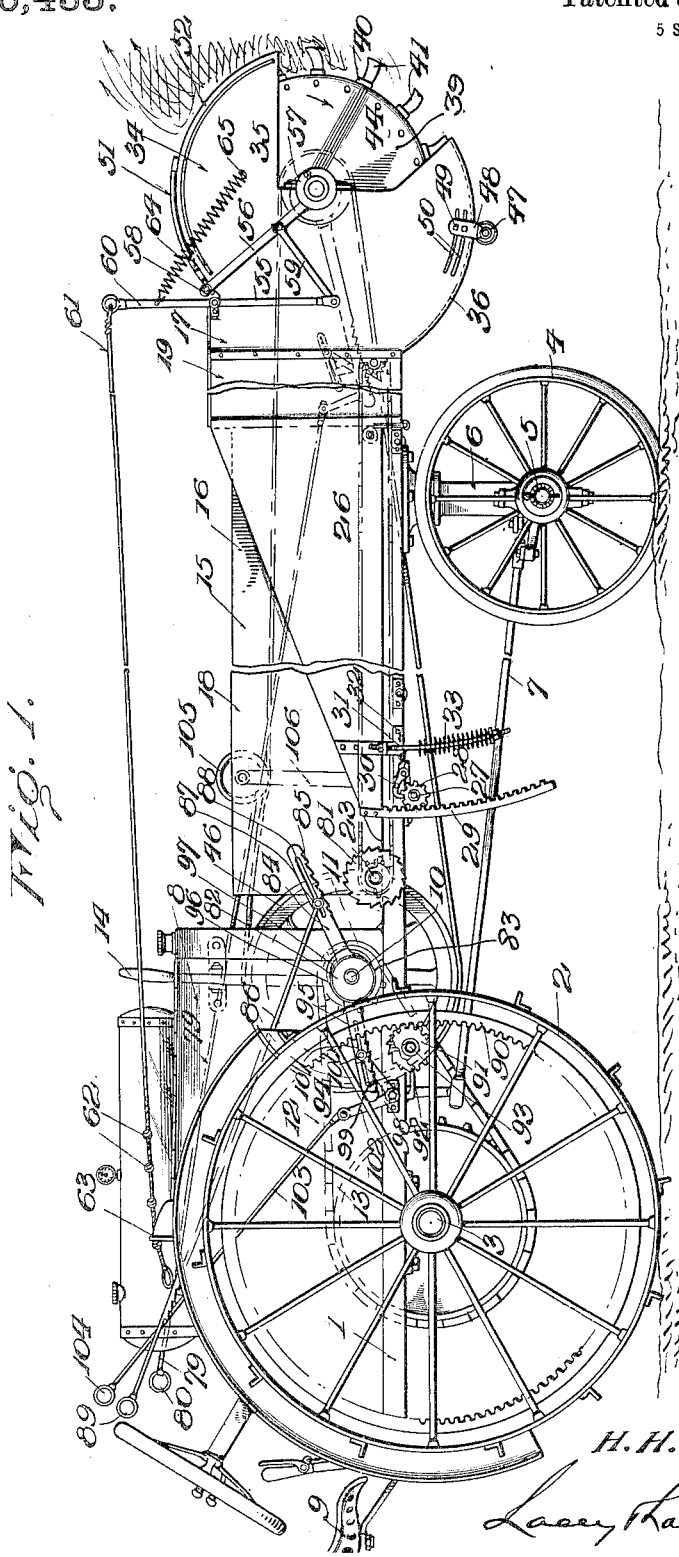

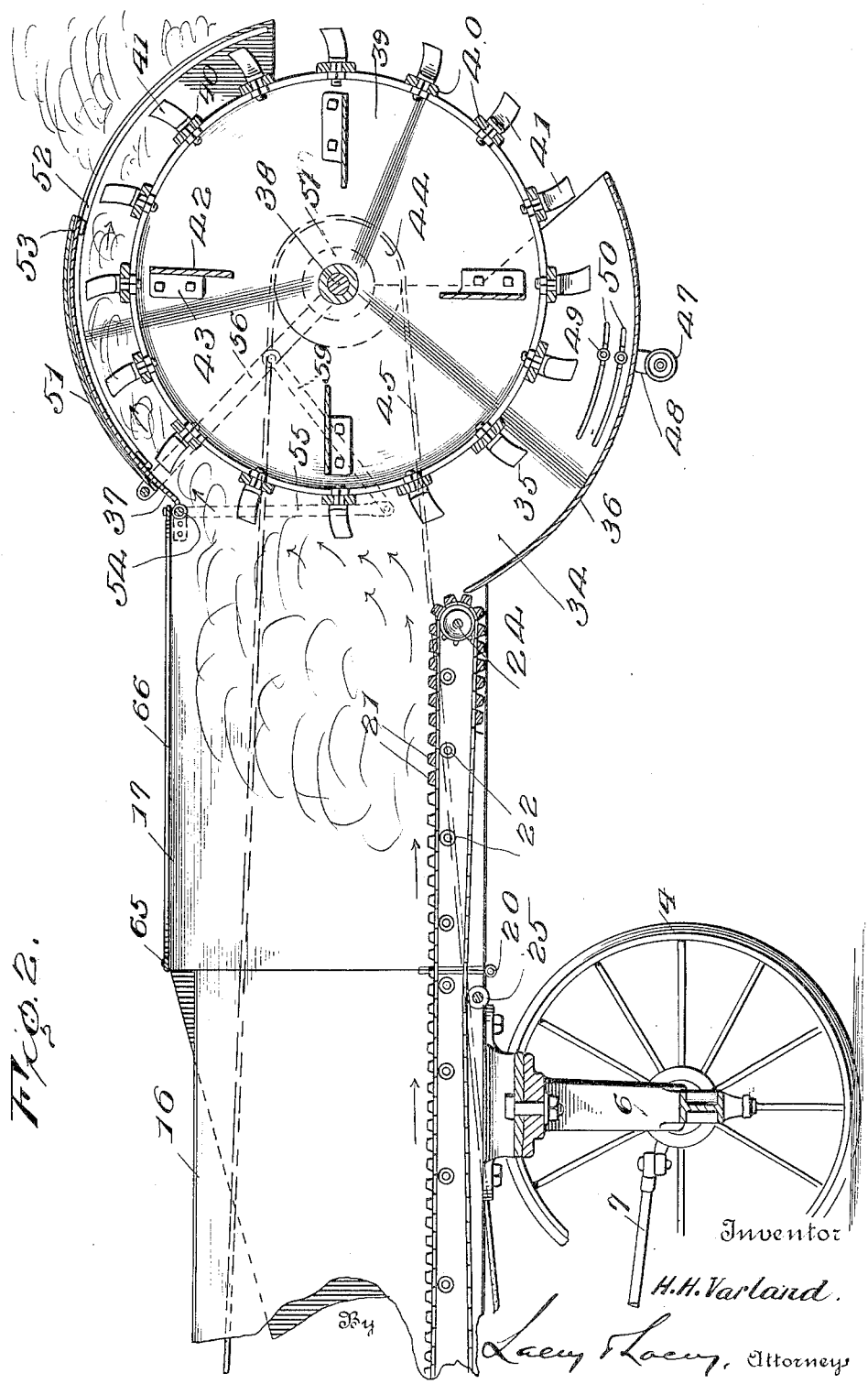

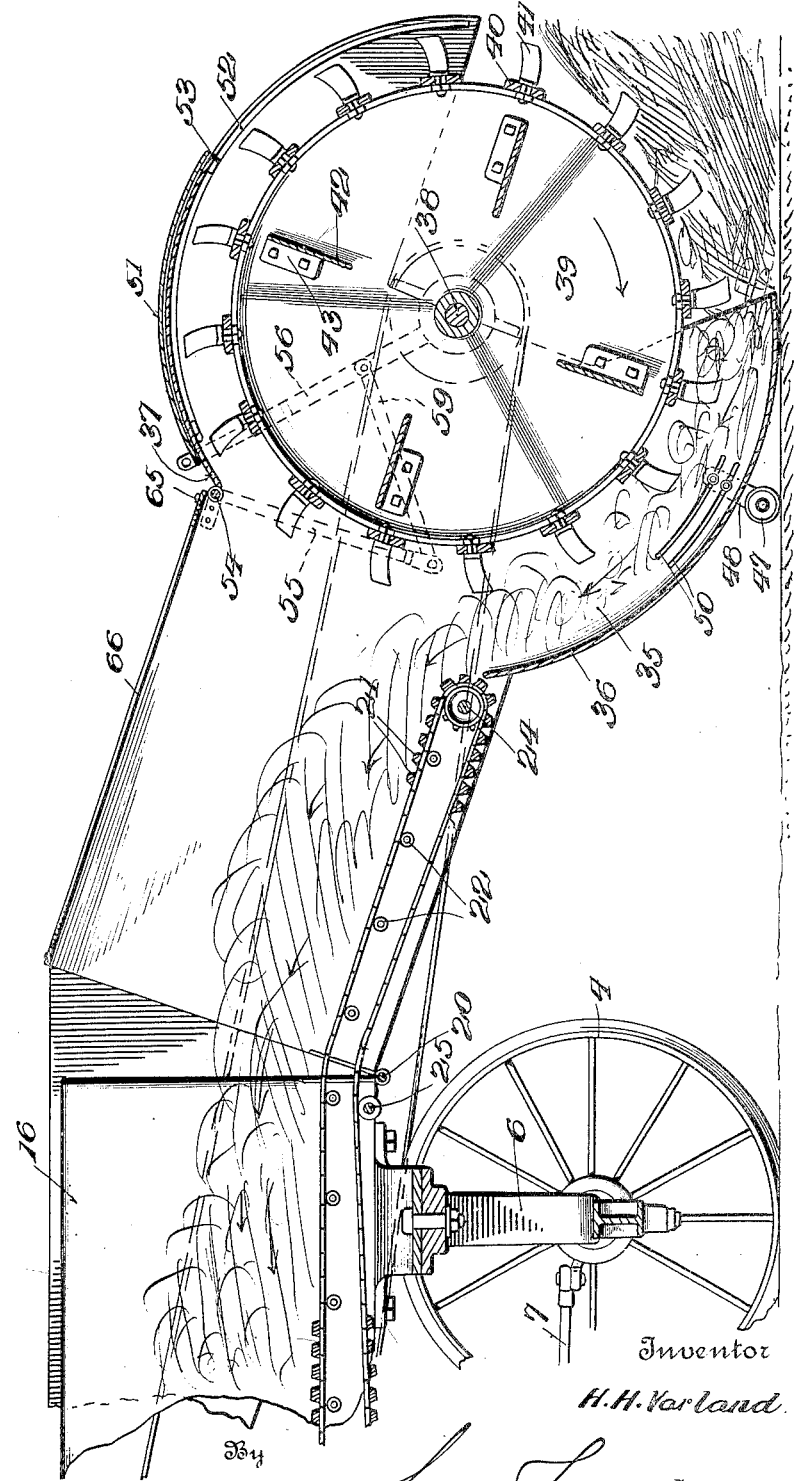

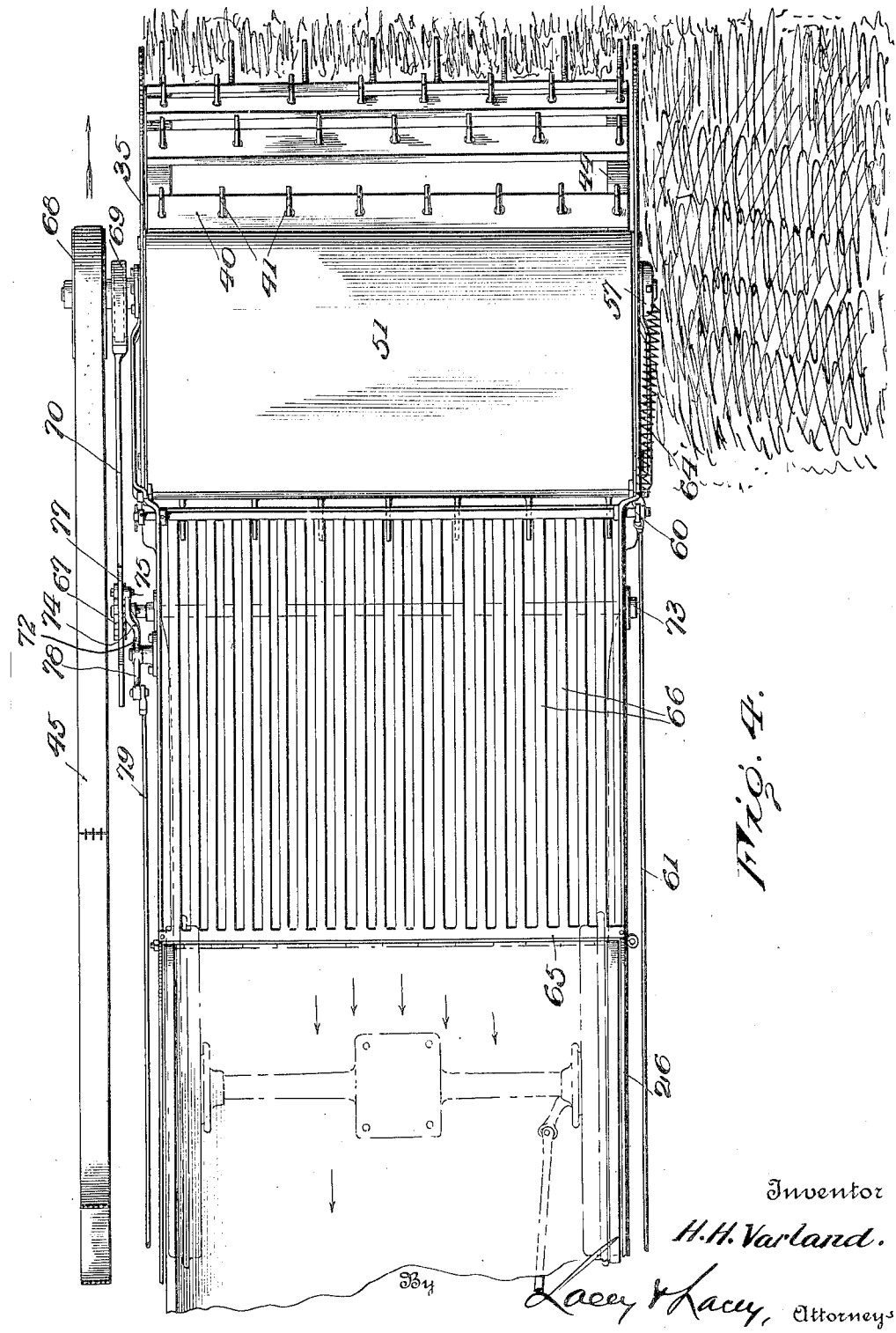

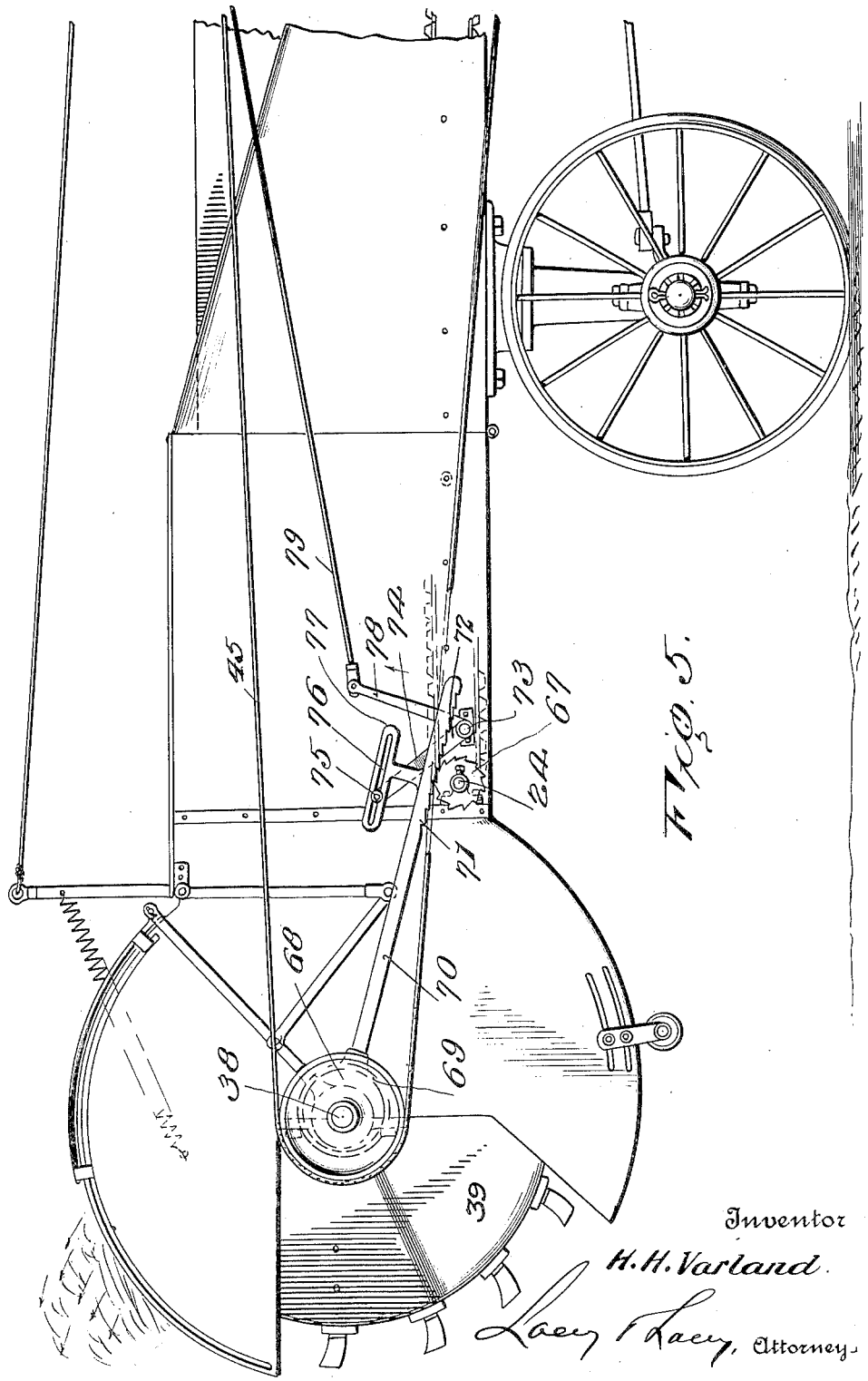

UNITED STATES PATENT OFFICE.

HIRAM H. VARLAND, OF CLARK, SOUTH DAKOTA.

COMBINED MANURE LOADER AND SPREADER.

1,346,433.          Specification of Letters Patent.     Patented July 13, 1920.

Application filed June 5, 1918, Serial No. 238,351. Renewed November 26, 1919. Serial No. 340,801.

*To all whom it may concern:*

Be it known that I, HIRAM H. VARLAND, a citizen of the United States, residing at Clark, in the county of Clark and State of South Dakota, have invented certain new and useful Improvements in Combined Manure Loaders and Spreaders, of which the following is a specification.

This invention relates to machines for handling manure and has as its primary object to provide a machine capable of employment both as a spreader and as a loader. As is well-known, considerable time and labor must be expended in loading the boxes of manure spreaders of the ordinary type now in use as this work must be accomplished manually by the use of pitch forks. Even aside from these objections, in the manual loading of the spreader box, the manure in windy weather is liable to be blown about and much of it wasted. As stated, therefore, it is the primary object of the present invention to provide a machine for handling manure, which machine may have its part readily and quickly so adjusted as to adapt the machine to work into the pile of manure and automatically load the same into the box of the machine, the machine being capable of having its said parts restored to normal positions and conditions so that the machine may then be subsequently employed in distributing or spreading the load of manure. In short the object of the invention is to provide a machine which may be operated to take up a load of manure from the pile and may then be employed in distributing the loaded manure.

Another object of the invention is to provide in a machine for the purpose set forth, means for so operating the usual conveyer apron and beater cylinder that these same parts may serve in one instance to distribute the manure in the usual manner and in another instance to take up a load of manure from the pile. Incidentally it is an object of the invention to provide means whereby the direction of travel of the conveyer apron may be readily reversed by the operator of the machine so that when the machine is being employed as a distributer or spreader the top stretch of the apron will travel in the direction of the beater cylinder to feed the load to the said cylinder, and when the machine is to be employed in taking up a load, to cause travel of the said stretch of the apron in the opposite direction so that as the manure is piled up upon the apron in the loading operation, it may be moved gradually toward that end of the box opposite the end at which the beater is located.

Another object of the invention is to provide means whereby the motion of the apron may be arrested at any time desired and for any desired length of time so that in the loading operation the apron may be permitted to remain stationary until the beater has piled up the manure upon the apron to a suitable height, and the operator of the machine may then permit motion to be imparted to the apron to carry this first portion of the load in a direction away from the beater and provide space for the accumulation of a succeeding portion of the load.

A further object of the invention is to provide means for automatically moving the machine bodily in the direction of the pile of manure, in a gradual manner during the loading operation and to so construct this means that it will be under the control of the operator of the machine so that it may be conveniently and readily rendered inactive by him, thus enabling him to control the speed and extent of movement of the machine toward and into the pile.

A further object of the invention is to provide in a single machine, including an endless conveyer apron and a beater cylinder, means for rotating the cylinder so that it may distribute the manure or take up and throw the same from the pile on to the apron, means for imparting travel to the apron in either direction so that when the machine is being used as a spreader, the manure will be fed to the beater and when being used as a loader will be carried in a direction away from the beater, and means for automatically advancing the machine during the feeding operation toward and into the pile of manure as the manure is taken up from the pile and delivered on to the said conveyer apron.

A further object of the invention is to so mount the beater and the adjacent portion of the conveyer apron that these parts may be dropped to position close to the ground so as to adapt the machine to act upon a relatively shallow manure pile as well as a deeper pile. More specifically the invention contemplates constructing the box of the machine in two sections the rear section being relatively fixed or stationary and the forward section being connected therewith in such manner as to permit of its downward tilting or dropping to carry with it the beater and the said forward portion of the conveyer apron, means being provided for readily and conveniently so angularly adjusting the last-mentioned section of the box.

A further object of the invention is the provision of means for supporting the forward end of the drop section of the box when the same is lowered on to the ground, in such manner that the said section will readily ride over inequalities in the ground surface and will, therefore, not be likely to be damaged when the machine as a whole is advanced into the manure pile. Incidentally the invention contemplates the provision of an adjustable means for the purpose just stated, whereby the beater may be brought into more or less close proximity to the ground surface.

The invention has as a further object the provision of means for preventing the scattering of the manure during the loading operation and preventing its being thrown over the top of the box, the means comprising a baffle device arranged immediately rearwardly of the beater cylinder at the top of the said box and consequently above the adjacent portion of the conveyer apron.

A further object of the invention is to provide in a machine of the type above described, a novel arrangement of parts such as will enable the operator of the machine to at all times observe the manner in which the machine is spreading so that he may better control the operation thereof, the machine being propelled over the ground surface by means of a motor which drives the rear tractor wheels of the machine and this motor being located at the rear end of the box of the machine and the beater cylinder being located at the forward end of the said box.

In the accompanying drawings:

Figure 1 is a side elevation of the machine embodying the present invention;

Fig. 2 is a vertical longitudinal sectional view through the forward portion of the machine and illustrating the drop section in raised or distributing position;

Fig. 3 is a view similar to Fig. 2, but illustrating the drop section of the box dropped or lowered to loading position;

Fig. 4 is a top plan view of the forward portion of the machine;

Fig. 5 is a side elevation of the rear portion of the machine viewing that side opposite to the side illustrated in Fig. 1 of the drawings.

In its general arrangement of parts, the machine embodying the present invention differs materially from manure spreaders now in use inasmuch as in the instance of the present machine the manure is distributed or spread from the forward end of the bed or box of the machine instead of from the rear end thereof, the beater cylinder being located at the said forward end of the box and a motor being mounted at the rear end of the box and being operatively geared with the rear wheels for the purpose of propelling the machine over the ground surface. Due to this novel arrangement, the operator of the machine is enabled to at all times observe the manner in which the manure is being spread in the field and he may therefore correspondingly control the operation of the distributing mechanism to produce a lighter or heavier spread as desired.

In the drawings the numeral 1 indicates in general the bed frame of the machine, and the numeral 2 indicates tractor wheels which support the rear end of this frame and which are fixedly mounted upon the ends of an axle 3, the forward end of the bed frame being supported by ground wheels 4 freely rotatably mounted upon spindles 5 carried by the usual bolster 6. Suitable steering mechanism indicated in general by the numeral 7 is, of course, connected with the spindles 5 to provide for steering the mechanism in its travel. The numeral 8 indicates in general an engine, such for example as an internal combustion engine which is mounted upon the bed frame 1 at the rear end thereof and in front of the operator's seat, which latter is indicated by the numeral 9. The engine shaft is indicated by the numeral 10, and loosely mounted upon this shaft at one end is a sprocket gear 11 about which is passed a sprocket chain 12 which chain is passed also about a sprocket gear 13 fixed upon one end of the axle 3. Any suitable clutch device indicated in general by the numeral 14 is provided for the purpose of clutching the gear 11 with the shaft 10 when it is desired to cause travel of the machine over the field and for unclutching the said gear when it is desired to arrest the movement of the machine or to bring into operation a means which will be presently specifically described and which operates to advance the machine with a step by step motion during the loading operation.

The box of the machine is indicated in general by the numeral 15 and this box as a whole is divided transversely at a point immediately in advance of the bolster 6, so as to provide front and rear sections indicated respectively by the numerals 16 and 17. The bed frame of the machine is correspondingly divided and it may, for the sake of clearness, be considered as a part of the box 15. The box sections 16 and 17 include side walls indicated respectively by the numerals 18 and 19, and, of course, the conveyer apron usually employed in machines of this type constitutes the bottom of the said box. The sections 16 and 17 of the box and bed frame are connected by a hinge joint 20 so that the section 17 may have downward swinging movement to substantially the position shown in Fig. 3 of the drawings and, in the operation of the machine as a spreader, may be caused to assume an upright or normal position, as shown in Figs. 1 and 2 of the drawings. The forward section of the box may, in view of the foregoing, be considered as a drop section and, of course, when dropped to the position shown in Fig. 3 it will permit of loading of the box as a whole, it being on the other hand raised to the position shown in Figs. 1 and 2 when the machine is to be employed as a spreader.

The endless conveyer apron above mentioned is indicated in general by the numeral 21 and the upper stretch thereof passes over rollers 22 as is usual in machines of this class. The apron at its rear end passes about a shaft 23 rotatably journaled in suitable bearings at the rear end of the box 15, and at its forward end the apron passes about a shaft 24 journaled in suitable bearings at the forward end of the section 17 of the box. Of course, when the forward or drop section of the box is dropped or swung downwardly to loading position, the forward portion of the conveyer apron will be deflected in a downward direction, and in order that the lower stretch of the said apron may be supported at the time of so adjusting the said section of the box the said lower stretch of the apron passes over an idle roller 25 mounted immediately rearwardly of the hinge connection 20 between the fixed and dropped sections of the box. Secured in any suitable manner to the outer faces of the side walls 19 of the section 17 of the box are metallic plates 26 which extend rearwardly and close beside the side walls of the section 16 of the said box, the said plates constituting lever arms in a manner which will now be explained. While the members 26 are illustrated in the drawings as in the form of metallic plates, these members may be of frame-like structure although it is preferable to employ plates, as said members will then serve to span and close the gap between the forward ends of the walls 18 and the rear ends of the walls 19 when the drop section of the box is swung downwardly. In order to provide for swinging of the members 26 and thereby raise or lower the drop section of the box as may be desired, a shaft 27 is mounted in suitable bearings transversely beneath the frame 1 of the machine and carries pinions 28 which mesh with arcuate racks 29 which racks are secured at their upper ends to the respective members 26 at the rear end of the said members as clearly shown in Fig. 1 of the drawings. One end of the shaft 27 is preferably squared for the application thereto of a crank handle (not shown) whereby it may be rotated, and it will be understood that when the shaft is rotated in one direction, the arcuate racks 29 will be moved upwardly to permit of lowering of the drop section to the loading position and when the shaft is rotated in the opposite direction, the racks will be moved downwardly so as to raise the said drop section to spreading position. A pawl 30 is provided for coaction with one of the pinions 28 so as to hold the shaft against rotation when the drop section has been adjusted to the desired position. In order to suitably cushion the lowering movement of the drop section, curved rods 31 are suitably secured at their upper ends to the members 26 and work through suitable guides 32 upon the respective sides of the bed frame 1. A spring 33 is arranged upon each of the rods 31 and by engagement with the respective guide 32, will serve the purpose above stated. Inasmuch as the drop section carries the beater cylinder and other parts to be hereinafter described, there is considerably more weight at the forward side of the hinge for the said section than at the rear side of the said hinge and, consequently, the tendency is for the said section to swing to its lowered position. Therefore, in order to lower the section it is not necessary to manually rotate the shaft 27 as it may be freed for rotation by lifting the pawl 30 out of engagement with the pinion 28. Then the downward or dropping movement of the section 17 will be cushioned by the spring 33 as above pointed out.

The beater cylinder of the machine is housed within a casing indicated in general by the numeral 34. The side walls of this casing are indicated by the numeral 35 and form a continuation of the respective side walls 19 of the drop section 17 of the box. The casing further includes a downwardly and forwardly curving bottom wall 36 and an upwardly and forwardly curving top wall 37. The bottom wall 36 of the casing is so curved and proportioned that when the drop section of the box is in lowered to loading position as shown in Fig. 3, the forward edge of the said bottom wall will lie close to the ground surface. It will be understood, of course, that the casing is open at its front inasmuch as the top wall 37 and bottom wall 36 have their forward edges terminating but slightly in advance of the transverse vertical plane in which the beater shaft is located. This shaft is indicated by the numeral 38 and is rotatably mounted in suitable bearings upon the side walls 35 of the casing and has fixed upon it the spaced heads 39 of the beater cylinder or drum. The usual slats 40 are secured at their ends to the peripheries of the heads 39 and complete the said cylinder or drum, and these slats support the beater teeth which are indicated by the numeral 41, and which teeth, in the rotation of the beater cylinder, are designed to throw or scatter the manure in a forward direction when the machine is being employed as a spreader and to pick the manure from the pile and throw it in a rearward direction and on to the apron 21 when the machine is being loaded. In order that a blast of air may be created in the rotation of the beater cylinder, it is preferable that fan blades 42 be provided, these blades being secured at their ends as at 43 to the inner or opposed faces of the heads 39 of the cylinder, as clearly shown in Fig. 2 of the drawings. The outer edges of the fan blades are located close to the periphery of the cylinder whereas their inner edges are spaced a suitable distance from the shaft 38. Of course, in the rotation of the cylinder both in the spreading and loading operations, the fan blades 42 will create a blast of air which will greatly assist in spreading the manure in the first instance and blowing the same rearwardly, in the latter instance. Also this air blast will serve effectually to prevent clogging of the teeth of the beater cylinder in both operations of the machine. By reference to Fig. 2 of the drawings it will be observed that the shaft 24 for the conveyer apron 21 is located immediately rearwardly of the beater cylinder so that in the spreading or distributing operation of the machine, in which operation the upper stretch of the apron 21 moves forwardly, the load of manure will be gradually fed toward the cylinder as material is picked from the load by the beater teeth and spread or distributed. Of course, in the loading operation of the machine the beater teeth in passing at the open side of the casing for the beater cylinder, will gather or pick material from the pile and throw the same in a rearward direction and on to the said apron 21. Inasmuch as in the first-mentioned operation of the machine the upper and rear sides of the cylinder are the effective or working sides, and in the loading operation of the machine the forward and under sides are the effective or working sides, the cylinder is, in both operations, rotated in the same direction. In order to impart rotary motion to the cylinder, a pulley 44 is fixed upon the shaft 38, and a belt 45 is passed about this pulley and also about a pulley 46 fixed upon the engine shaft 10. As before stated, when the drop section of the box is in loading position as shown in Fig. 3 of the drawings, the forward edge of the bottom wall 36 of the casing housing the beater cylinder will be located in close proximity to the ground surface, but in order to prevent this edge digging into the soil or coming in contact with raised portions of the ground surface, rollers 47 are provided for supporting the casing for passage over the ground surface. These rollers are mounted for free rotation at the lower ends of bracket plates 48 disposed against the outer sides of the side walls 35 of the beater cylinder casing and held in place by means of bolts 49 which are adjustably received in arcuate slots 50 formed in the said side walls 35. It will be apparent and particularly by reference to Figs. 2 and 3 of the drawings, that the rollers 47 may be adjusted toward and from the forward edge of the bottom wall 36 of the casing 34 by loosening the bolts 49 and then sliding the bracket plates 48 along the side walls 35 of the said casing in a forward or rearward direction and then again tightening the bolts.

Upon reference to Fig. 2 of the drawings it will be readily understood that when the machine is in use as a spreader, the upper stretch of the apron 21 will be traveling in the direction of the beater cylinder, and as the cylinder rotates the beater teeth 41 will pick up the manure as it is fed to the cylinder and will throw or scatter the same in a forward direction, the manure being, of course, discharged through the open forward side of the casing 34. Usually it will be desirable to leave the said side of the casing entirely open as shown in Fig. 2 to provide for a more thorough scattering of the material, but when the machine is in operation in windy weather it is desirable that means be provided for partly closing the open side of the casing, especially the upper portion of the said open side so that the manure will be deposited more nearly in a direct downward direction on to the ground surface, as otherwise the wind would blow the material to one side to such an extent that an even swath could not be deposited. Therefore, in order to accomplish the desired result the top wall 37 of the casing 34 is supplemented by an adjustable hood which may occupy the position shown in Fig. 2 or may be moved to a greater or less distance in a forward direction and consequently to extend forwardly beyond the forward edge of the said top wall 37. This hood is indicated by the numeral 51 and the same comprises an arcuate plate of substantially the same dimensions as the top wall 37, the hood being disposed concentrically with relation to the shaft 38 and the said top wall 37 and exteriorly of the said wall. To guide the hood and hold the same assembled with the casing 34, the side walls of the casing are formed with arcuate slots 52 which extend from a point adjacent the rear end of the top wall 37 to a point nearly horizontally opposite the shaft 38. At the corners of the hood 51, the plate comprising the hood is provided with downstruck ears or lugs 53 which work in the said slots 52 so that the hood is in this manner supported for concentric backward and forward movement upon the top of the casing and is at the same time secured against outward separation from the casing. In order to provide for adjustment of the hood from the operator's position upon the machine, a shaft 54 is rotatably mounted at the rear end of the wall 37 and fixed upon each end of the shaft is a lever arm 55. Lever arms 56 are provided with collars 57 which loosely fit the ends of the shaft 38, and which collars provide for swinging movement of the arms 56 about the shaft as a center. The arms 56 are pivotally connected at their outer or upper ends as at 58 with the rear corners of the hood 51, and connecting bars or links 59 are connected with the arms 56 and the lower ends of the respective arms 55. The arm 55 is provided with an upward extension indicated by the numeral 60 and to the upper end of this extension is connected one end of a flexible element, such for example as a rope or cable indicated by the numeral 61. This flexible element is led rearwardly and is provided at intervals throughout its rear portion with knots or other abutment elements 62 which may be selectively brought into engagement with any suitable keeper device 63. A spring 64 is connected at one end as at 65 to that side wall of the casing 34 at which the lever arm carrying the extension 60 is located and the other end of this spring is connected to the said extension of the lever arm. By reference to Fig. 1 of the drawings it will be understood at this point that the spring 64 exerts a pull upon the extension of the lever arm 55 in a manner to cause the said arm to in turn exert a pull upon the connecting bar 59 and, therefore, the hood 51 is normally held at the rear limit of its movement. However, by pulling upon the cable 61 and swinging the lever arm against the tension of the spring 64, the hood will be rotated in a forward direction to more or less completely cover and close the upper side of the open front of the casing 34. The hood may be held in adjusted position by engaging a selected one of the knots or abutments 62 with the keeper device 63.

Of course, in the loading position of the drop section of the box, the hood 51 will preferably be located in full open position so that it will in no way interfere with the advancing movement of this section of the box, and the beater cylinder, into the pile of manure, and also in order that substantially the entire forward side of the said cylinder may act upon the pile to disintegrate and gather the same and throw the material rearwardly onto the conveyer apron 21. In order to prevent the manure being thrown upwardly and entirely out of the drop section of the box where it would be struck by wind currents and scattered about promiscuously, the top of the box is substantially closed by a grille comprising a frame 65 in which are mounted a number of bars 66 which are mutually spaced and extend preferably longitudinally of the said section of the box. Of course, any of the material striking the bars 66 will be arrested in its upward motion and will then fall onto the conveyer apron or onto the material already deposited on said apron.

As before stated, when the machine is employed in spreading or distributing the manure, the conveyer apron 21 is to be fed in such a manner that its upper stretch will travel toward the beater cylinder and in order that this may be accomplished, and with intermittent motion, means is provided which will now be described. Fixed upon one end of the shaft 24 which shaft, as before explained, is the forward apron shaft, is a ratchet pinion 67. An eccentric 68 is fixed upon the beater shaft 38 and continuously rotates with said shaft, and a strap 69 surrounds this eccentric and has fixed to it one end of a rack arm 70. The arm 70 is provided at its lower edge at its rear end with a series of rack teeth 71. In the rotation of the shaft 38 reciprocatory motion will, of course, be imparted to the arm 70 and in the rearward movement of this arm the rack teeth 71 will ride idly over the teeth of the ratchet 67, but in the forward movement of the arm the rack teeth 71 will positively engage the teeth of the ratchet 67 and rotary motion will be imparted to the shaft 24. Thus as the arm 70 is reciprocated through its eccentric connection with the shaft 38, intermittent rotary motion will be imparted to the shaft 24 in a direction to cause the upper stretch of the conveyer apron to travel forwardly, or in other words, toward the beater cylinder, so long as the machine is in operation and the arm 70 is in active position, as shown in Fig. 5. However, when the machine is being operated to load the box thereof it is essential that motion be imparted to the apron in such manner that the upper stretch will travel in a rearward direction, or in other words away from the beater cylinder, and at such time it is, of course, necessary that the rack arm 70 be raised to inactive position, or in other words, out of coactive relation to the ratchet 67. To provide for such adjustment of the rack arm, an angle lever 72 is pivotally mounted as at 73 upon one side wall of the drop section of the box immediately rearwardly of the adjacent end of the shaft 24, and one arm of this lever, indicated by the numeral 74, is provided at its upper end with a pin 75 which works loosely in a slot 76 formed in a head 77 which projects from the upper edge of the rack arm 70. To the upper end of the other arm of the angle lever, which arm is indicated by the numeral 78, is connected the forward end of a rod 79 which extends rearwardly and has its rear end provided with a handle 80 located in convenient reach of the occupant of the seat 9. A stated, the pin 75 works loosely in the slot 76 and, therefore, reciprocation of the rack arm 70 is in no way interfered with, and, furthermore, due to the loose fit of the parts, the arm 70 may have the necessary slight upward movement in riding idly over the teeth of the ratchet 67. However, when the rod 79 is pulled rearwardly the angle lever 72 will be rocked in such a manner as to swing its arm 74 in an upward direction and in this manner the rack arm 70 will be moved out of coactive engagement with the ratchet 67, and the parts may be retained in this position while the means for imparting the rearward travel to the apron is in operation. Also while the machine is being driven from one field to another or otherwise when it is not being employed in distributing or spreading the manure, the rod 79 will be drawn rearwardly so as to render the rack arm 70 inactive.

In order that intermittent motion may be imparted to the conveyer apron in a manner to cause its upper stretch to travel rearwardly during the loading operation of the machine, means is provided similar to the means just described for causing forward travel of the said stretch of the apron. This latter means includes a ratchet pinion 81 which is fixed upon one end of the rear shaft 23 for the conveyer apron. The numeral 82 indicates an eccentric which is fixed upon the corresponding end of the engine shaft 10 and to which is fitted an eccentric strap 83 having connected to it the rear end of a rack arm 84. The lower edge of this arm at its forward end is provided with rack teeth 85 which are designed to coact with the teeth of the ratchet pinion 81. Thus in the reciprocation of the ratchet arm 84, while the engine shaft 10 is rotating, the teeth 85 will ride idly over the teeth of the ratchet 81 when the arm 84 is moving forwardly and will positively engage said teeth when the arm is moving rearwardly so as to, in the latter instance, rotate the shaft 23. At this point it is to be noted that when the shaft 24 is rotated through the reciprocation of the arm 70, this rotation will be in a direction to exert a forward pull upon the upper stretch of the conveyer apron which is, of course, desirable if not essential, and in like manner when the shaft 23 is rotated through the reciprocation of the ratchet arm 84, a rearward pull will be exerted upon this load supporting stretch of the apron. The numeral 86 indicates a rod which at its forward end is provided with a pin 87 fitting loosely in a slot 88 formed longitudinally in the arm 84. Of course, so long as the pin 87 is at an intermediate point in the length of the slot 88, the said arm 84 may reciprocate freely, but when it is desired to swing the arm 84 upwardly to the position shown in Fig. 1 of the drawings and thereby render the apron moving means inactive, this may be accomplished by exerting a rearward pull upon the arm 86 until the pin 87 engages in the rear end of the slot 88 when upon continued rearward movement of the rod 86, the said arm will be swung in the direction stated. In order that the rod may be conveniently manipulated, it is provided at its rear end with a handle 89 located in convenient reach of the operator of the machine occupying the seat 9.

As before pointed out, when the machine is being operated to load its box, it is desirable that the machine be gradually and preferably intermittently moved toward and into the pile of manure to be loaded. In order to provide for such movement of the machine toward the pile, the traction wheel 2 at that side of the machine at which the eccentric 82 is located, carries an internal gear 90, and a pinion 91 meshes with this gear and is fixed with relation to a ratchet 92, the pinion and ratchet being mounted upon a shaft 93 upon the bed frame 1 of the machine. Coacting with the teeth of the ratchet 92, are the ratchet teeth 94 of a rack arm 95 which arm is connected at its forward end to an eccentric strap 96 fitting an eccentric 97 fixed upon the shaft 10. When the arm 95 is in coöperative relation to the ratchet 92, and is reciprocated through the rotation of the eccentric 97, the teeth 94 of the said arm will ride idly over the teeth of the ratchet as the arm is moved rearwardly and will positively coact with the teeth as the arm is moved forwardly so that upon each forward movement of the arm, the ratchet is rotated a part of a turn and corresponding motion is imparted to the pinion 91 and from the said pinion to the gear 90 and traction wheel 2. Of course, in the loading operation of the machine it may not be found desirable to have the belt continuously intermittently moved rearwardly as it is desirable that the manure be piled upon the upper stretch of the belt to the maximum capacity of the box of the machine, and, of course, by adjustment of the rod 86 as hereafter pointed out, the operator of the machine may render the apron moving means inactive at any time desired and may equally as readily render the same active. Likewise it may not be found advisable to have the machine continuously moved in the direction of the pile being loaded especially if the material is packed very closely and, therefore, means is provided whereby the arm 95 may be manually swung upwardly to inactive position to render the advancing means for the machine inactive when so desired. This means includes an angle lever 98 mounted upon the bed frame of the machine and having one arm 99 provided with a pin 100 working in a slot 101 in the arm 95. To the other arm 102 of the said angle lever is connected the forward end of a pull rod 103 which is led rearwardly and provided at its rear end with a handle 104 by means of which it may be conveniently moved forwardly or rearwardly to adjust the angle lever for the purpose stated.

As heretofore pointed out the roller 25 is provided to prevent sagging of the lower stretch of the conveyer belt 21 when the drop section of the box is lowered to loading position, and inasmuch as I have found that if the drive belt 45 is tight when the said drop section of the box is in loading position, it will be slack when the section is in raised or distributing position, means is provided for taking up this slack automatically when the said section of the box is swung upwardly. This means comprises an idle pulley 105 mounted at the upper end of a bracket arm 106 secured to that one of the members 26 located at the same side of the box at which the said belt 45 is located. When the rear ends of the members 26 are swung downwardly through the rotation of the shaft 27 and for the purpose of swinging the drop section of the box upwardly the idle pulley 105 will be lowered into engagement with the upper stretch of the drive belt 45 for the purpose, as stated, of taking up the slack in the belt.

From the foregoing description of the invention, it will be seen that there is provided a machine which possesses desirable features of construction when operated as a manure spreader or distributer and in which the distributing mechanism may be effectually employed in loading the box of the machine. Thus in the use of the machine the tiresome and time consuming pitch fork loading of the box is entirely obviated and the work of fertilizing the fields may be accomplished more readily and quickly and with the expenditure of less labor than in the use of the ordinary distributer, or spreader. Assuming that the box of the machine is empty and that the machine is to be brought into use, the operator will pull rearwardly upon the handles 80, 89 and 104, will start his engine, and will actuate the clutch device 14 to throw the traction wheels into clutch with the engine. He will then guide the machine to the pile of manure where it is to be loaded and upon reaching the pile will release the pawl 30 permitting the drop section of the box, carrying the beater cylinder, to lower to the ground in about the position shown in Fig. 3 of the drawings. In the meantime he will, of course, have thrown the clutch 14 so as to bring the machine to a standstill. With his engine still running he will throw in the usual clutch (not shown) ordinarily provided upon manure distributers for the purpose of connecting the beater shaft with the power shaft, and will then or at any desired subsequent moment, shift the handle 89 forwardly so as to bring the ratchet arm 84 into coactive relation to the ratchet 81. This will be done, for example, when he has noted that the beater device has piled up a suitable quantity of manure upon the upper stretch of the conveyer apron. Intermittent motion will then be imparted to the apron and this motion may be arrested whenever found desirable. Also at the proper time he will shove forwardly upon the handle 104 to throw the arm 95 into coactive relation to the ratchet 92 so that as the beater teeth gather up the manure from the pile and consume the pile, the machine will be advanced into the pile in order that the said teeth may attack a fresh portion thereof. Of course, if at any time the operator finds that the machine is being moved too rapidly into the pile he may pull upon the handle 104 until conditions warrant further advance of the machine.

Having thus described the invention, what is claimed as new is:

1. In a machine for handling manure, a load supporting bed including a drop section, and means operable in the raised position of the section to distribute the load and in the dropped position of the section to load material on to the bed.

2. In a machine for handling manure, a load supporting bed including a drop section, beater mechanism carried by the drop section and arranged in the raised position of the section to distribute the load and in the lowered position of the section to load material onto the beater, and means for operating the said mechanism.

3. In a machine for handling manure, a bed including a fixed section and a drop section, beater mechanism carried by the drop section, means for actuating the said beater mechanism, a conveyer, and means for selectively operating the conveyer toward and from the beater mechanism.

4. In a machine for handling manure, a bed including a fixed section and a drop section, beater mechanism carried by the drop section, means for actuating the beater mechanism, an endless conveyer apron common to the two sections, and means for selectively causing travel of the load supporting stretch of the apron board and from the beater mechanism.

5. In a machine for handling manure, a load supporting bed including a fixed section and a section swingingly connected therewith whereby the latter may be swung downwardly in proximity to the ground surface, beater mechanism carried by the last-mentioned section, and means for actuating the beater mechanism.

6. In a machine for handling manure, a bed including a fixed section and a section swingingly connected therewith, beater mechanism carried by the swinging section, means for actuating the beater mechanism, an endless conveyer apron common to the two sections, and means for moving the supporting stretch of the apron selectively toward and from the said beater mechanism.

7. In a machine for handling manure, a load supporting bed including a drop section, means operable in the raised position of the section to distribute the load and in the lowered position of the section to load material on to the bed, and means operable to bodily advance the machine in the loading operation.

8. In a machine for handling manure, a bed including a drop section, a rotary beater carried by the drop section and operating when actuated upon material upon the bed to distribute the said material and when acting upon a pile of material, when the drop section is in lowered position, to throw the said material on to the bed, and means for rotating the beater.

9. In a machine for handling manure, a bed including a fixed section and a drop section, a rotary beater carried by the drop section, a power shaft, means for transmitting power from the power shaft to the beater, and means actuated through rotation of the power shaft for imparting motion to the machine in the direction in which the beater is presented.

10. In a machine for handling manure, a bed including a fixed section and a drop section, a rotary beater carried by the drop section, a power shaft, means for transmitting power from the power shaft to the beater, and means actuated through rotation of the power shaft for imparting step by step motion to the machine in the direction in which the beater is presented.

11. In a machine for handling manure, a bed including a fixed section and a drop section, an endless conveyer common to the two sections, a rotary beater carried by the drop section, means for rotating the beater with its lower portion traveling toward the conveyer and its upper portion traveling away from the conveyer, and means for imparting motion to the conveyer selectively in a direction toward the beater and from the beater.

12. In a machine for handling manure, a bed including a fixed section and a drop section, an endless conveyer common to the two sections, a rotary beater carried by the drop section, means for rotating the beater with its lower portion traveling toward the conveyer and its upper portion traveling away from the conveyer, means for imparting motion to the conveyer selectively in a direction toward the beater and from the beater, and means for moving the machine with a step by step motion in the direction in which the beater is presented.

13. In a machine for handling manure, a bed including a fixed section and a drop section, a rotary beater carried by the drop section, means for rotating the beater, a conveyer common to the two sections, means for operating the conveyer selectively toward and from the beater, a traction wheel, and means for imparting step by step rotary motion to the traction wheel to advance the machine in the direction in which the beater is presented.

14. In a machine for handling manure, a bed including a fixed section and a drop section, a rotary beater carried by the drop section and including a beater shaft, conveyer shafts carried by the fixed and drop sections, an endless conveyer passing about the shafts, means for rotating the shaft upon the drop section to move the conveyer toward the beater, and means for rotating the shaft upon the fixed section for moving the conveyer in a direction away from the beater.

15. In a machine for handling manure, a bed including a fixed section and a drop section, a rotary beater carried by the drop section and including a beater shaft, conveyer shafts upon the fixed and drop sections, an endless conveyer actuated by the shafts, means actuated through rotation of the beater shaft for imparting motion to the conveyer shaft upon the drop section to move the conveyer in the direction of the beater, and means for imparting motion to the conveyer shaft upon the fixed section for moving the conveyer in a direction away from the beater.

16. In a machine for handling manure, a bed including a fixed section and a drop section, a rotary beater carried by the drop section and including a shaft, conveyer shafts upon the fixed and drop sections of the bed, a conveyer actuated by the rotation of either conveyer shaft, a ratchet upon the conveyer shaft which is carried by the drop section, a rack member reciprocated through rotation of the beater shaft and means for moving the said rack member into and out of coactive relation to the said ratchet.

17. In a machine for handling manure, a bed including a fixed section and a drop section, a rotary beater carried by the drop section and including a shaft, conveyer shafts upon the fixed and drop sections of the bed, a conveyer actuated by the rotation of either conveyer shaft, a ratchet upon the conveyer shaft which is carried by the drop section, a rack member reciprocated through rotation of the beater shaft, means for moving the said rack member into and out of coactive relation to the said ratchet, a ratchet upon the conveyer shaft which is carried by the fixed section of the bed, a rotary shaft, a rack member reciprocated through rotation of the last-mentioned shaft, and means for moving the rack member into and out of coactive relation to the last-mentioned ratchet.

18. In a machine for handling manure, a bed including a fixed section and a drop section, a rotary beater carried by the drop section and including a beater shaft, conveyer shafts carried by the fixed and drop sections of the bed, a conveyer actuated through rotation of either of said conveyer shafts, means for imparting motion to the conveyer shaft upon the drop section and actuated through rotation of the beater shaft, a rotary shaft, and means for rotating the conveyer shaft upon the fixed section and actuated through rotation of the last-mentioned shaft.

19. In a machine for handling manure, a bed including a fixed section and a drop section, a rotary beater carried by the drop section and including a beater shaft, conveyer shafts carried by the fixed and drop sections of the bed, a conveyer actuated through rotation of either of said conveyer shafts, means for imparting motion to the conveyer shaft upon the drop section and actuated through rotation of the beater shaft, a rotary shaft, means for rotating the conveyer shaft upon the fixed section and actuated through rotation of the last-mentioned shaft, and means whereby either of the motion transmitting means between the beater and last-mentioned shaft and the respective conveyer shafts may be selectively rendered active and inactive.

20. In a machine for handling manure, a bed including a fixed section and a drop section, a rotary beater carried by the drop section and including a beater shaft, conveyer shafts carried by the fixed and drop sections of the bed, a conveyer actuated through rotation of either of said conveyer shafts, means for imparting motion to the conveyer shaft upon the drop section and actuated through rotation of the beater shaft, a rotary shaft, means for rotating the conveyer shaft upon the fixed section and actuated through rotation of the last-mentioned shaft, the machine including a traction wheel, and means actuated through rotation of the last-mentioned shaft for imparting step by step rotary motion to the said traction wheel.

21. In a machine for handling manure, a bed including a fixed section and a drop section hingedly connected therewith for downward swinging movement, the said drop section having a side member extending beside the fixed section, and coacting means upon the fixed section and the said side member of the drop section for raising and lowering the drop section.

22. In a machine for handling manure, a bed including a fixed section and a drop section hingedly connected therewith for downward swinging movement, the said drop section having a side member extending beside the fixed section, a rack bar upon the said side member, and a pinion upon the fixed section meshing with the said rack.

23. In a machine for handling manure, a bed including a fixed section and a drop section hingedly connected therewith for downward swinging movement, the said drop section having a side member extending beside the fixed section, coacting means upon the fixed section and the said side member of the drop section for raising and lowering the drop section, and coacting means upon said side member and said fixed section for cushioning the downward swinging movement of the drop section.

24. In a machine for handling manure, a box including a drop section, an endless conveyer mounted in the box, a beater rotatably mounted within the drop section of the box, and a grid extending over the top of the drop section of the box.

25. In a machine for handling manure, a bed including a fixed section and a drop section, beater mechanism carried by the drop section, and means for supporting the drop section for passage over the ground surface when dropped.

26. In a machine for handling manure, a load supporting bed, forward and rear wheels supporting the bed for travel, a motor at the rear part of the bed, gearing between the motor and the rear wheels for propelling the machine, distributer means at the forward part of the bed, and gearing between the said motor and the distributing means for driving the latter.

In testimony whereof I affix my signature.

HIRAM H. VARLAND. [L. S.]